March 8, 1927.
C. R. FISHER
1,620,531
APPARATUS FOR LOADING AND UNLOADING MATERIALS
Filed March 26, 1920    3 Sheets-Sheet 1
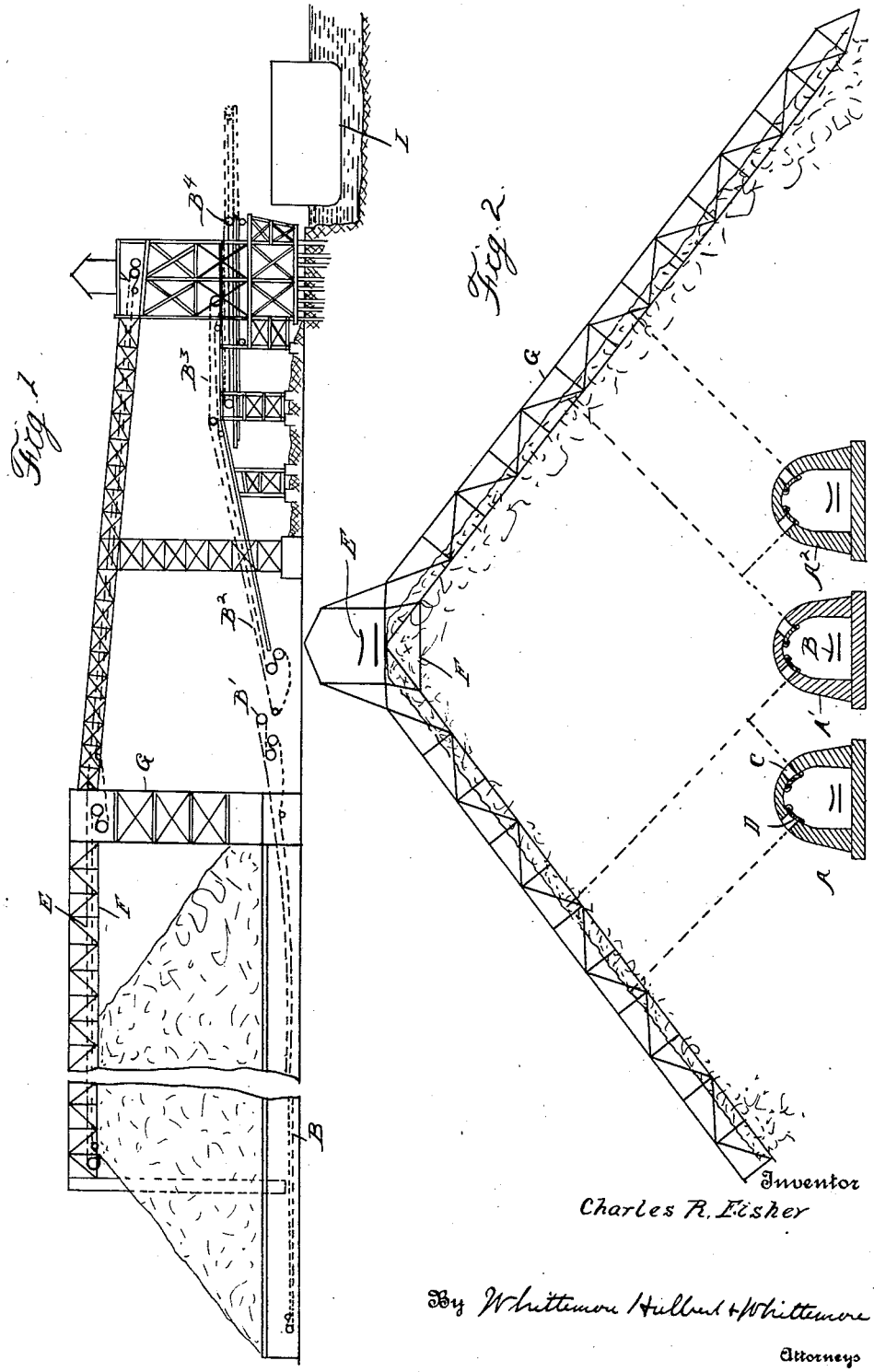

March 8, 1927.
C. R. FISHER
1,620,531
APPARATUS FOR LOADING AND UNLOADING MATERIALS
Filed March 26, 1920    3 Sheets-Sheet 2
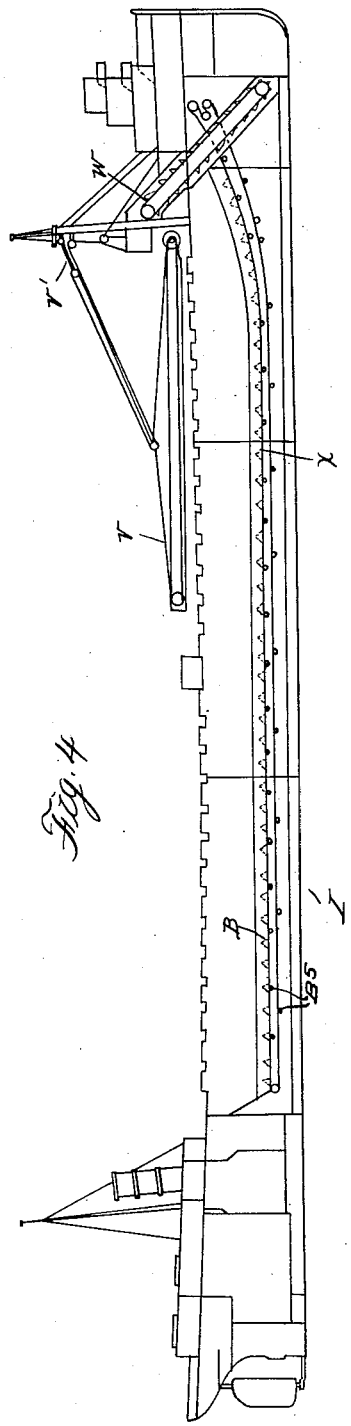
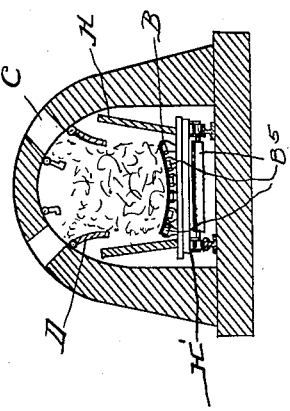
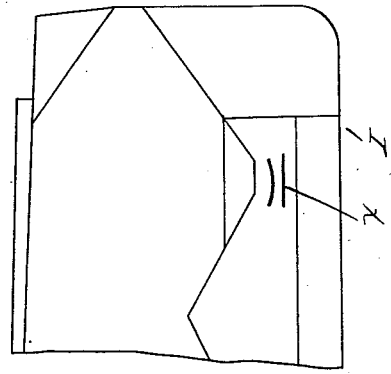
Inventor
Charles R. Fisher
By Whittemore Hulbert & Whittemore
Attorneys March 8, 1927.

C. R. FISHER 1,620,531

APPARATUS FOR LOADING AND UNLOADING MATERIALS

Filed March 26, 1920     3 Sheets-Sheet 3

Inventor
Charles R. Fisher
By Whittemore Hulbert + Whittemore
Attorneys

Patented Mar. 8, 1927.

1,620,531

UNITED STATES PATENT OFFICE.

CHARLES R. FISHER, OF ROGERS CITY, MICHIGAN.

APPARATUS FOR LOADING AND UNLOADING MATERIALS.

Application filed March 26, 1920. Serial No. 368,999.

The invention relates to conveyor systems more particularly designed for use in the loading and unloading of bulk material derived from natural deposits, such, for instance, as limestone. It is the object of the invention; first, to reduce the cost of original installations; second, to reduce to the minimum manual operations, thereby eliminating the uncertainty of personal equations; third, to provide controls which are either automatic or operable to control the entire system from one point; fourth, to reduce the cost of operation and of maintenance; and fifth, to obtain various advantages, as hereinafter fully set forth.

In the drawings:

Figure 1 is a side elevation of the loading apparatus;

Figure 2 is a cross-section thereof;

Figure 3 is an enlarged cross-section through one of the tunnels;

Figure 4 is a diagrammatic longitudinal section through a boat, showing the unloading device applied thereto;

Figure 5 is a cross-section thereof; and

Figure 6:
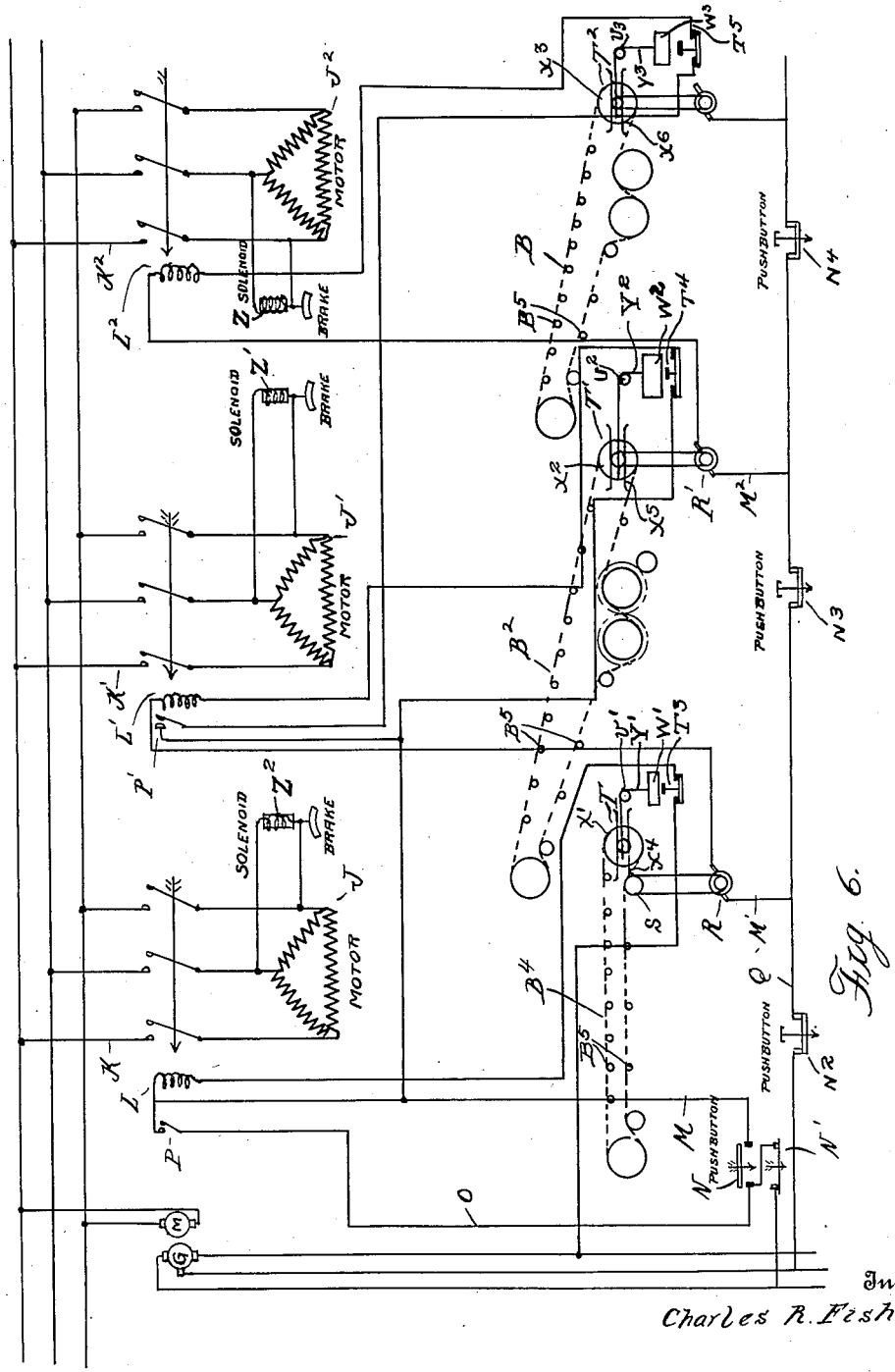
Figure 6 is a diagram showing the control mechanism.

In the loading of bulk materials on boats, trains, and other means of transportion, it is usual to provide an expensive over-head installation generally including bins, or other storage receptacles, from which the material is periodically discharged into the conveyance. The location of such installations must be carefully chosen, and frequently, after once installed some unforeseen change will render it useless at the point of erection. Furthermore, it is necessary to provide apparatus both at the point of loading and at the various points of unloading, and even where the loading point is permanent, changes in the markets will require corresponding changes of the points of unloading.

It is the primary object of the present invention to dispense with costly permanent installations, substituting therefor a simplified apparatus at the loading point and portable unloaders. In both the loading and the unloading apparatus traveling belts are substituted for other conveyors and a series of separately actuated belts is so controlled as to avoid all possibility of interference or lack of cooperation.

Loading apparatus.

The material to be loaded is drawn from a pile through one or more tunnels A, A', etc. extending longitudinally thereof. Each of these tunnels contain a belt conveyor B, which receives material from the pile through openings C in the top of the tunnel, said openings having the gates D for closing the same. The pile is formed and replenished from an over-head belt conveyor E, which runs centrally longitudinallly of the pile and is supported on a suitable truss F on A-frames G.

To direct the material from the pile into the openings C at the tunnels a hopper or its equivalent is required. The building of such an extensive hopper would be a very great item of expense, which is eliminated by merely forming a large pile having its dimensions limited only by the height of the truss and the width of base established by the angle of repose of the sides. This pile, therefore, contains a dead portion which is never disturbed, but which forms the equivalent of a hopper at a comparatively small cost. The active portion of the pile is that which is included between planes coincident with the angle of repose from the openings in the outer tunnels.

As has been stated, the material is withdrawn from the pile through the openings C, which may be uncovered by the opening of the gates D. This permits of withdrawing material from one point in the pile simultaneously with the replenishment of the pile at some other point or points; but is has been found practically impossible after a gate is once opened, to close the same again against the pressure of the material flowing through the opening. It is nevertheless important to regulate the flow, which I have accomplished without the necessity of closing the gate through the simple expedient of choking the outlet by the material already discharged therethrough. Thus, as shown, there is arranged within each of the tunnels a traveling hopper H, which is supported upon a carriage H' straddling the conveyor belt B and which may be shifted into registration with a particular opening C through which the material is to be temporarily withdrawn. The hopper H is formed with inclined sides, but without a bottom, which latter is formed by the belt B, this being preferably given a concave form by supporting rollers $B^5$. Where the belt is traveling at normal rate, it will remove the material as fast as it accumulates, but if the belt is stopped, the material will build up within the hopper until it reaches a point where it will choke the entrance. Thus there will be an automatic control of the flow and the quantity delivered may be regulated by intermittent operation of the conveyor.

For delivery of the material into the boat, or other conveyance, it is frequently necessary to elevate the same to clear the deck. This requires an inclined conveyor, the inclination being such as to carry the load up the same without displacement on the belt. It is also necessary to provide means for distributing the material in the boat as it is being loaded, so as to avoid straining. I therefore preferably provide a system of conveyors containing at least three elements, viz, the horizontal conveyor which travels through the tunnel and carries the load out therefrom; second, an inclined conveyor for elevating the load; and third, a reciprocating conveyor or shuttle of any suitable design which distributes the load as it is being deposited in the hold of the vessel. As shown, the portion of the conveyor B, outside of the tunnel, is slightly elevated and passes around the pulley $B'$, so as to deposit its load upon the inclined conveyor $B^2$. The latter extends to the proper elevation, terminating in a horizontal portion $B^3$ which is arranged above the reciprocating conveyor or shuttle $B^4$. The shuttle has a range of reciprocation which is equal to the width of the boat or the hatch opening therein, so that the material may be distributed to maintain the boat on even keel. The system just described is the same for each of the tunnels A, $A'$ and $A^2$ and the several shuttles $B^4$ are preferably so spaced as to come in registration with different hatch openings in the boat. Thus, the boat will be loaded simultaneously at several points in the hold and as frequently as necessary the feeding of material may be stopped and the boat shifted to bring new hatch openings into registration with the shuttles.

The successful operation of a system such as described is absolutely dependent upon control such that if a stoppage occurs at one point, the cooperating elements of the system may be also instantaneously stopped. For instance, if one of the shuttles is stopped through any cause and the rest of the system maintained in movement, this will result in the continued deposit of material on the shuttle from the inclined conveyor $B^2$, soon resulting in serious damage. In the same manner a stoppage of the conveyor $B^2$ while the conveyor B is in movement will produce a similar result. Again, if any one of the elements breaks down, it is imperative that all of the cooperating supply elements should be instantaneously stopped. Such control I have obtained by rendering the motors or power supplying means for each of the conveyor elements dependent in its operation on the movement of the conveyor element, which is directly supplied by said first-mentioned element. The detailed construction of this control system is not the subject matter of the present application for patent, but in general the construction is as follows:

The conveyors $B^4$, $B^2$ and B are respectively actuated by electric motors J, $J'$ and $J^2$, which are so connected as to drive the belts at the proper speed. Each motor is provided with a controlling switch which is operated by an electro-magnetic actuating mechanism in a control circuit and the arrangement is such that the switches are successively closed or opened, the motor from one conveyor being dependent for its operation upon the operativeness of the adjacent conveyor.

Various constructions of automatic controls may be used for this purpose, but as shown, the construction is as follows: K, $K'$ and $K^2$ are the controlling switches, respectively, for the motors J, $J'$ and $J^2$, and L, $L'$ and $L^2$ are electro-magnets for closing said switches. M is an electric control circuit, which includes the magnet L. N is a circuit closer or push button for the circuit M which is normally open, but which, when closed, will energize the magnet L and will close the switch K for the motor J. The push button N is used only to initially close the circuit and will automatically open when released, but there is provided a branch circuit O independent of the push button N, having a normally opened circuit closer P, which is closed when the circuit M is once established. Thus the circuit will be maintained through the branch O after the button N is opened. $N'$ is a push button or circuit breaker for opening the branch circuit O to cause the opening of the switch K and stopping of the motor J.

The motor J actuates the conveyor $B^4$, which operates the shuttle at the delivery end of the system and the actuation of the push button N therefore first starts this delivery conveyor. The motors for the other conveyors are successively started by control circuits dependent upon the operation of the conveyor $B^4$ and as shown, the means employed is as follows: Q is an electric control circuit supplying current to the magnets $L'$ and $L^2$, but insufficient to energize said magnets so as to close their respective switches $K'$ and $K^2$. R is a booster generator which is included in a branch $M'$ of the circuit Q, including the magnet $L'$, said generator being driven by power derived from the conveyor $B^4$. Thus, as shown, the generator R is driven from a friction wheel S in contact with the belt $B^4$, so that it is necessary for the belt to acquire a predetermined velocity before the generator becomes operative. When, however, this velocity is attained, the current in the branch $M'$ of the circuit Q will be sufficiently augmented to energize the magnet $L'$ and to close the switch $K'$. This will start the motor $J'$, which will drive the conveyor $B^2$. In the same manner a booster generator $R'$ in the branch circuit $M^2$, including the magnet $L^2$ and which is driven from the conveyor $B^2$, will cause the closing of the switch $K^2$ as soon as the conveyor $B^2$ is in full operation. If there are more units in the system, they will be successively actuated by similar devices.

The magnet $L'$ actuates a normally open circuit closer $P'$ in the circuit $M^2$ and therefore the closing of the switch $K^2$ is dependent upon the switch $K'$ and the opening of said switch $K'$ by de-energizing the magnet $L'$ will instantaneously break the circuit of the magnet $L^2$. In the same way, the de-energizing of the magnet L by causing the opening of the circuit closer P will instantaneously open the circuit $M'$ and de-energize the magnet $L'$. Thus the stopping of the motor J through the opening of its switch K also stops each of the motors $J'$ and $J^2$. The motors $J'$ and $J^2$ will also be stopped if the conveyor $B^4$ slows down below a predetermined speed since the voltage of the generator R will thereby be reduced sufficiently to de-energize the magnet $L'$ and consequently will release the switch $K'$. In case of breakage of the conveyor belt $B^4$, the motor J and its electric circuit might still remain in operation, but this is prevented by placing in the circuit M an additional circuit breaker T, which will be operated by an over-load on or clogging of the belt $B^4$, or in case the belt breaks; so that whenever the conveyor becomes inoperative, its motor is instantaneously stopped. A similar circuit breaker $T'$ is placed in the circuit $M'$ to be actuated by an over-load upon or breaking of the conveyor $B^2$ and a circuit breaker $T^2$ is correspondingly arranged in connection with the circuit $M^2$ and conveyor B.

The circuit breakers T, $T'$ and $T^2$ may be of any suitable design that will be actuated by an overloading or breakage of the conveyor belt but are specifically shown as follows: $T^3$, $T^4$ and $T^5$ are normally closed electric switches respectively arranged in the circuits containing the solenoids L, $L'$ and $L^2$ and adapted to open only upon a predetermined movement of the tail pulleys $X'$, $X^2$ and $X^3$, the latter being arranged to take up any slack in the belts in the respective conveyors $B^4$, $B^2$ and B. In the drawings the tail pulleys are all indicated diagrammatically since the use of movable tail pulleys is common in the art, but as shown, they are yieldingly held outward against the tension of the conveyor belts by the weights $W'$, $W^2$ and $W^3$ which are connected to the same by the cords $Y'$, $Y^2$ and $Y^3$, the latter passing over the fixed pulleys $U'$, $U^2$ and $U^3$ so as to allow the tail pulleys to have a horizontal movement in the guides $X^4$, $X^5$ and $X^6$.

From the construction just described, it will be understood that when the push button N is operated, the delivery conveyor $B^4$ is first set into the motion and when full velocity is attained, the conveyor $B^2$ is operated and after this also has acquired a predetermined velocity, the conveyor B is actuated. This will preclude the overloading of any of the conveyors as the conveyors on which the load is delivered are always in operation in advance of the delivering conveyors. It will also be understood that the stopping of the conveyors at the delivery end from any cause, such as breaking of the belt or slipping of the belt on the drive pulley, or the breaking of any part of the drive mechanism, will instantaneously stop the motors for the conveyors $B^2$ and B. It may, however, be desirable to stop the operation of the system, while the units thereof are all in operative condition. This can be accomplished either by operating the circuit opener $N'$, which is adjacent to the delivery conveyor $B^4$, or at other points in the system by circuit openers $N^2$, $N^3$ and $N^4$, which are placed at various points in the control circuit Q. The circuit openers $N^2$ and $N^3$ etc. will not stop the entire system, but each, when operating will stop some particular unit, together with all units at the delivery end thereof.

In operation, when a boat or other conveyance I is ready to be loaded, it is so positioned at the dock that the shuttles $B^4$ of the several conveyor systems are in alignment with a corresponding number of hatch openings. Within each of the tunnels the hopper H is moved into registration with the particular openings C through which the material is to be drawn and the gate D is then opened to permit discharge of the material through said hopper onto the belt B. The whole system is set in motion by the control switch N at the delivery end and by reason of the control system, previously described, the conveyors will be successively started, each attaining its full velocity before movement of the supplying element is initiated. Therefore, on starting the system the shuttle conveyor B⁴ is first put into motion, then the inclined conveyor B², and lastly the tunnel conveyor B. When the whole system is in movement, the material carried by the conveyor B is fed onto the inclined conveyor B² and from the latter onto the shuttle B⁴. The shuttle is adapted to be reciprocated by suitable means (not shown) during the feeding movement thereof and the material will therefore be deposited uniformly from one side of the boat to the other. When a predetermined load has been deposited, movement of the entire system is arrested by pressing the circuit opener N' which simultaneously de-energizes all of the motors. At the same time the solenoids Z, Z' and Z² are also de-energized thus releasing brakes of any suitable construction which are applied to the several elements and the braking force is so adjusted that the tunnel feed is first arrested, then the inclined conveyor, and finally the shuttle. This precludes the possibility of clogging which might occur if any conveyor is stopped before the conveyor element feeding material thereto.

In normal operation, the control of the system is solely from the one point, viz the point of delivery into the conveyance. There are, however, occasions when it is necessary to stop the operation, due to conditions arising at some other point in the system. For instance, one of the conveyor belts might break, in which event the automatic operation of the mechanism previously described will arrest movement of all the conveyors on the supplying side thereof, but not necessarily the conveyors which are supplied by the broken element. Thus, if the broken belt is the inclined conveyor B², the tunnel belt B will be instantaneously arrested, but the shuttle B⁴ may continue its operation so as to permit the clearing of the same of the load already deposited thereon. In the same manner, if the tunnel belt becomes inoperative, the inclined belt and shuttle may continue operation; but in case the shuttle becomes inoperative, the whole system is instantaneously stopped.

While the conveyors are controlled, as just described, it is difficult or impossible to either automatically or manually close the gates in the tunnel for the reason that the enormous load above said gates coupled with the inertia of movement is too great to be overcome by any gate closing apparatus which it is practical to install. However, as previously described, a perfect control may be obtained by the automatic choking of the flow by the material within the hopper H and resting upon the belt B. Thus, after a gate is once opened, it is unnecessary to close it until the pile of material directly above the same is practically exhausted, after which it may be readily closed, and when locked will sustain any load which may be piled thereabove. This permits of withdrawing material from one portion of the pile at the same time as it is being deposited in another portion of the pile, and further, permits of stopping and starting the system as often as desired without movement of the gates. A further advantage is that there is no necessity for regulating the velocity of movement of the conveyors in the system as the quantity of material conveyed may be fully regulated by starting and stopping.

*Unloading apparatus.*

The unloading apparatus comprises a similar system of cooperating conveyors arranged in the boat, or other conveyance, and adapted to discharge the load therefrom. Thus, as shown, the boat I is provided with a delivery conveyor V, which is mounted upon a swinging boom V', so that the load may be discharged to either side of the vessel. The conveyor V receives its load from a cooperating elevating conveyor W, which in turn receives its load from a conveyor X extending longitudinally of the vessel. These several conveyor units are controlled by a similar electric control system as that used in the loading device, and the arrangement is such that either the stopping or the inoperativeness of the delivery conveyor will at once stop the entire system. The specific construction of the unloading mechanism does not, however, form the subject matter of the present application and therefore will not be described more in detail.

What I claim as my invention is:

1. The combination of a plurality of endless belt conveyors for progressively advancing a load, means for independently driving said conveyors, and means dependent upon the operation of each conveyor to which a load is delivered for maintaining the operation of the conveyor delivering the load thereto said last mentioned means being independent of the operation of the conveyors at the supply end thereof.

2. The combination of a plurality of endless belt conveyors for progressively advancing a load, means for independently driving said conveyors, means dependent upon the operation at a predetermined speed of a conveyor to which the load is delivered for maintaining the operation of the conveyor delivering its load thereto said last mentioned means being independent of the operation of the conveyors at the supply end thereof.

3. The combination of a plurality of endless belt conveyors for progressively advancing a load, means for independently driving said conveyors, and means controlling the starting and continuance of operation of each conveyor which discharges a load upon another conveyor dependent upon the continuance of operation of said other conveyor and not dependent upon the operation of the conveyor at the supply end thereof.

4. The combination of a plurality of endless belt conveyors for progressively advancing a load, means for independently driving said conveyors, manually operable controlling means for the conveyor at the delivery end, and automatic controlling means for each of the other conveyors of the series, whereby the starting and continuance of operation of each is dependent upon the continuance of operation of the conveyor onto which its load is discharged and is not dependent upon the continuance of operation of any conveyor at the supply end thereof.

5. The combination of a plurality of endless belt conveyors arranged in series to progressively advance a load, means for independently driving said conveyors, manually operable means controlling the driving of the conveyor at the delivery end, automatic controlling means for each of the other conveyors of the series, through which the starting and continuance of operation of each of said conveyors is dependent upon the continuance of operation of the conveyor onto which it discharges its load, and means independent of said automatic control for operating each conveyor independent of the other conveyors.

6. The combination of a plurality of endless belt conveyors arranged in series to progressively advance a load, means for independently driving said conveyors, manually operable means for starting the conveyor at the delivery end of the series, manually operable means at a plurality of points along said series for stopping the conveyor at the delivery end of the series, and automatic controlling means for each of the other conveyors of the series, whereby the starting and maintenance of operation of each is dependent upon the maintenance of operation of the conveyor onto which it discharges its load.

7. The combination of a plurality of endless belt conveyors arranged in series to progressively advance a load, means for independently driving said conveyors, an electric control for the driving means of each conveyor which discharges its load upon another conveyor, said electric control being effected by the stopping, slowing or breaking of the conveyor on which the load is delivered to arrest movement of the conveyor delivering its load thereto.

8. The combination of a plurality of endless belt conveyors arranged in series to progressively advance a load, an independent electric motor for driving each conveyor, manually operable stopping and starting means for the motor of the conveyor at the delivery end of the series, automatic controlling means for each of the other motors, whereby the starting of each is dependent on the prior starting of the motor for the conveyor on the delivery side thereof and also dependent on the attainment of a predetermined speed of said conveyor, and whereby the slowing, stopping or breaking of said conveyor will effect the stopping of said motor.

9. The combination of a plurality of conveyors arranged in series to progressively advance a load, means for independently driving said conveyors, manually operable means controlling the starting and stopping of the driving means for the conveyor at the delivery end of the series, and automatic controlling means for the driving of each of the other conveyors, whereby each conveyor is normally started later and stopped in advance of the conveyor onto which it discharges its load and means actuated by an overloading or breakage of one of said conveyors for stopping the same and also stopping the preceding conveyors while allowing the continuance of operation of the succeeding conveyors.

10. The combination with a conveyor and means for driving said conveyor, of a generator driven by said conveyor, and a relay controlled by the voltage produced by said generator.

11. The combination with an endless belt conveyor for advancing a load, and means for driving said conveyor, of means for feeding a load to said conveyor, an electric generator driven by said conveyor and means dependent upon a predetermined electrical generation of said generator for maintaining the operation of said feeding means.

12. The combination with an endless belt conveyor for advancing a load, and means for driving said conveyor, of means for feeding a load to said conveyor, a generator driven by said conveyor, a relay controlled by the voltage produced by said generator, and means operated by said relay for controlling the operation of said feeding means.

13. The combination with an endless belt conveyor, and means for driving the same, of a second conveyor arranged to deliver a load to said first conveyor, means for driving said second conveyor, means for controlling the driving means for said second conveyor, a generator driven by said first conveyor, and a relay controlled by the voltage produced by said generator for operating the controlling means for said second conveyor.

14. The combination of a plurality of endless belt conveyors for progressively advancing a load, means for independently driving said conveyors, a plurality of generators driven by the respective conveyors, and an electric control for the driving means of each conveyor which discharges its load upon another conveyor, said electric control being effected by the change in voltage of the generator driven by the succeeding conveyor of the system.

15. The combination with a plurality of endless belt conveyors for progressively advancing a load, and means for independently driving the same, of means actuated upon the overloading of one of said conveyors for automatically stopping the overloading conveyor and also stopping the conveyors preceding the same while allowing the succeeding conveyors to remain in operation.

16. The combination of a plurality of conveyors arranged in series to progressively advance a load, means for independently driving said conveyors, automatic controlling means for the driving of each of said conveyors, and means actuated by an overloading or breakage of one of said conveyors for stopping the same and also stopping the preceding conveyors while allowing the continuance of operation of the succeeding conveyors.

17. The combination with a conveyor and means for driving the same, of a second conveyor arranged to deliver a load to the first-mentioned conveyor, means for driving said second-mentioned conveyor, a relay adapted to control said second-mentioned driving means upon a predetermined change of voltage and electrical means driven by said first-mentioned conveyor and arranged in circuit with said relay, said electrical means being adapted to change the voltage in said circuit upon a predetermined change of speed of said first-mentioned conveyor.

In testimony whereof I affix my signature.

CHARLES R. FISHER.